Dec. 22, 1953   V. J. PALMER ET AL   2,663,314
VALVE FOR WATER CONDITIONING DEVICES
Filed Sept. 19, 1949
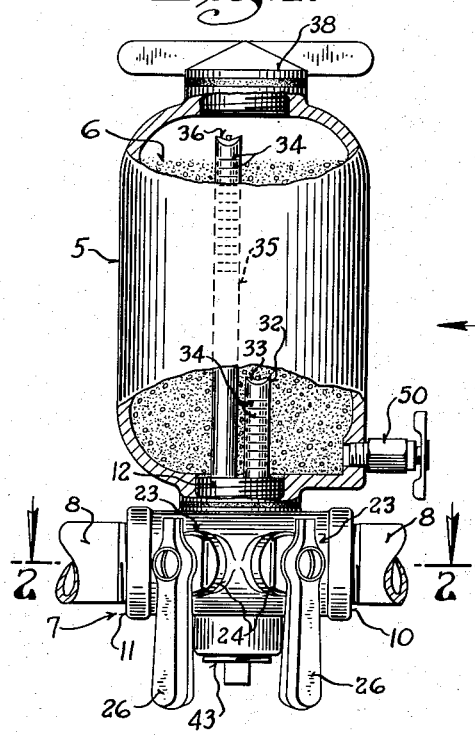
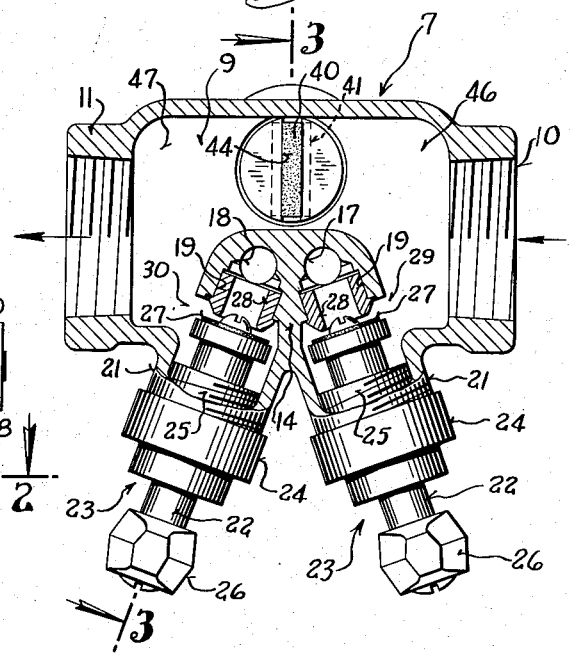
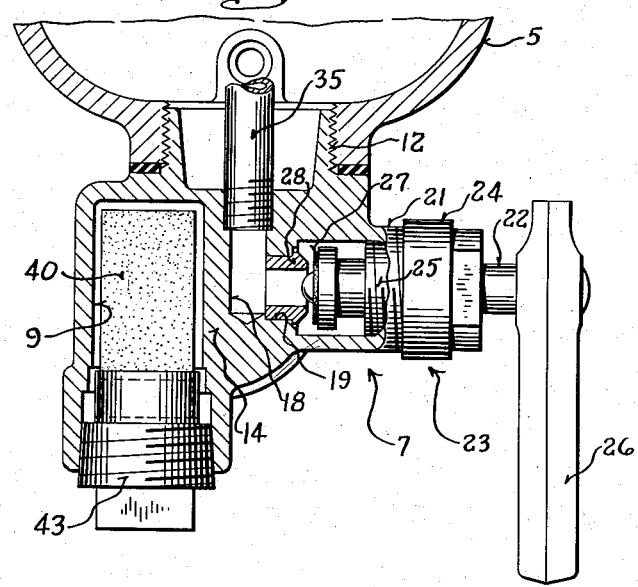
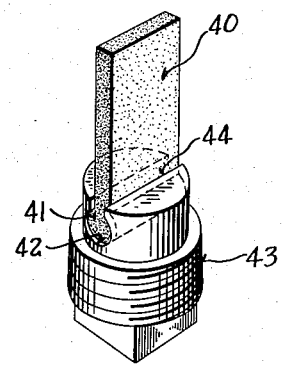
Inventors
Vernon J. Palmer
Julius S. Judell

Patented Dec. 22, 1953

2,663,314

UNITED STATES PATENT OFFICE 2,663,314

VALVE FOR WATER CONDITIONING DEVICES

Vernon J. Palmer and Julius S. Judell, Milwaukee, Wis., assignors to Bruner Corporation, Milwaukee, Wis., a corporation of Wisconsin Application September 19, 1949, Serial No. 116,471

5 Claims. (Cl. 137—599.1)

This invention relates to water conditioning systems and refers more particularly to water conditioning devices like that of the copending application of Vernon J. Palmer, Serial No. 116,472, filed September 19,1949, now Patent No. 2,404,446.

The purpose of the conditioning device of the aforesaid copending application is to treat water chemically to improve its qualities. This is effected by directing a portion of the water flowing in a water feeder line through chemicals contained in a receptacle or pot connected in parallel flow relationship with the feeder line, so that the water passing through the receptacle will absorb some of the chemicals therein and transfer them to the water by-passing the pot when the treated water is returned to the feeder line. In this manner, treatment of all of the water flowing through the feeder line is achieved.

Inasmuch as it is necessary to replenish the supply of chemicals from time to time, conditioning devices of the type herein concerned are usually provided with a shut-off valve by which the chemical pot may be shut off from the feeder line during the time fresh chemicals are added to the pot. Heretofore, a specially constructed valve capable of simultaneously closing both the inlet and outlet ducts for the chemical pot was used for this purpose. Such valves, however, are costly to manufacture and are further objectionable in that they necessitate precision machining operations to be performed on the conditioning device itself.

With this objection in mind, it is one of the purposes of this invention to provide a water conditioning device of the character described which is constructed to enable the use of standard faucet valves therewith.

Another objection to past water conditioning devices of the type herein described resulted from the practice of incorporating a fixed restriction in the water feeder line between the inlet and outlet ends of the branch passages connecting the line with the chemical pot. The purpose of restricting the feeder line in this manner is to create a pressure differential at opposite sides of the restriction sufficient to normally effect diversion of water from the feeder line into the inlet branch passage for circulation through the chemical pot. However, because of the fixed nature of the restriction, it could only perform its intended function during normal or average conditions of use of the conditioning device.

At times when the demand for treated water was relatively slight, all the water in the feeder line tended to flow slowly past the restriction, by-passing the chemical pot, and there was no assurance that any of the water would be chemically treated. At times of relatively great demand for water at the point or points of use the fixed restriction cut down flow through the feeder line to an extent such that an entirely inadequate amount of water reached the point of use. In other words, the restriction caused an objectionably high pressure drop in the feeder line at the downstream side of the restriction preventing delivery of the desired amounts of water at the point or points of use.

This latter objection to past water conditioning devices is overcome in the aforementioned copending application of Vernon J. Palmer by the use of a pressure responsive restriction in the feeder line capable of yielding to less restrict the feeder line in proportion to an increasing demand for water at the point of use.

Hence, it is another object of the present invention to provide a water conditioning device of the character described with a novel fitting or valve structure for operatively connecting the chemical pot with the feeder line and which valve structure is so constructed as to not only accommodate the standard faucet valves previously referred to but to also accommodate a yieldable restriction like that of the aforementioned copending application.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawing illustrates one complete example of the physical embodiment of the invention constructed in accordance with the best mode so far devised for the practical application of the principles thereof, and in which:

Figure 1 is a side elevational view of a water conditioning device embodying the principles of this invention, parts thereof being broken away and shown in section;

Figure 2 is an enlarged sectional view taken through Figure 1 along the plane of the line 2—2;

Figure 3 is a fragmentary cross sectional view taken through Figure 2 along the plane of the line 3—3; and Figure 4 is a perspective view of the yieldable restriction showing the same assembled with the retaining plug therefor.

Referring now more particularly to the accompanying drawing, in which like numerals indicate like parts throughout the several views, the water conditioning device of this invention comprises an upright cylindrical receptacle or pot 5 adapted to contain a chemical or chemicals 6 for treating the water, and a valve body 7 carried by the pot at the bottom thereof and serving as a fitting to provide for connection of the pot with a water feeder line 8 through which the water to be treated is adapted to flow to one or more points of use. The fitting or valve body 7 is formed with a main passage 9 extending horizontally therethrough and provided by aligning lateral inlet and outlet branches 10 and 11, respectively. The branches 10 and 11 are internally threaded and provide inlet and outlet ports, respectively, for the valve body. The water feeder line 8 is adapted to be connected with the lateral branches 10 and 11 of the fitting so that the main passage 9 thereof forms a part of the water feeder line.

At its upper side the fitting 7 is provided with a reduced neck 12 which is threaded into an aperture in the bottom of the receptacle or pot 5 to thereby join the valve body to the chemical pot and to mount the latter upon the water feeder line 8.

Medially of the ends of the passage 9, the fitting is provided with a wall portion 14 extending downwardly from the neck 12 of the fitting to the bottom of the passage 9. This wall portion 14 joins with one side wall of the body of the fitting and projects transversely into the passage 9 therefrom to about the center of the passage, as seen in Figure 2. Hence, the main flow of water through the passage 9 is around to the left of the wall portion 14, as seen in Figure 3.

The chemical pot or receptacle is connected in parallel flow relationship with the main passage 9 of the valve body 7 by means of parallel upright branch passages 17 and 18 extending downwardly through the neck 12 of the body and into the wall portion 14 of the fitting. The axes of these branch passages lie in a plane parallel to the axis of the inlet and outlet ports 10 and 11, so that if water flows through the passage from right to left, as indicated in Figure 2, the branch passage 17 closest to the inlet port comprises the inlet duct for the receptacle, while the branch passage 18 adjacent to the outlet port comprises the outlet duct for the receptacle.

The lower end of each branch passage 17 and 18 communicates with the inner end of a bore 19 leading horizontally into the front side of the valve body having the wall portion 14 thereon. The axes of the bores 19 lie in a horizontal plane containing the axis of the inlet and outlet ports 10 and 11 and converge inwardly toward the center of the passage 9. At their outer ends, the bores 19 are enlarged and each opens to the front side of the valve body through a tubular neck 21.

The spindle 22 of a conventional faucet valve 23 is received in each of said bores, with the cap nuts 24 of the valves threaded over the exteriors of the necks 21 and with their spindle or propelling screws 25 threaded into mating coarse threads on the interiors of the necks 21. Each spindle has a handle 26 fixed to its outer end and the usual disc washer 27 attached to its inner end and adapted to be propelled toward and from engagement with the seating surface of an annular valve seat 28 pressed into the inner end of each bore 19 adjacent to the lower ends of the branch passages 17 and 18.

When the valves are open, as seen in Figure 2, water entering the inlet port 10 of the fitting 7 is adapted to enter a flow opening 29 in the upstream end of the wall portion 14, and to pass through the valve seat 28 into the lower end of the inlet branch passage 17 for circulation through the chemical pot 5. The water circulated through the chemical pot absorbs some of the chemicals therein, and is returned to the passage 9 through the outlet branch passage 18 so as to transfer chemicals to the water bypassing the chemical pot. For this purpose, another flow opening 30 is provided in the downstream end of the wall portion 14, to communicate the downstream end of the passage 9 with the lower end of the outlet branch passage 18. In this case also, the water must pass through the valve seat 28 and into the bore 19 to reach the flow opening 30.

Hence the flow opening 29 adjacent to the inlet port 10 of the fitting provides the mouth of the inlet branch passage 17, while the flow opening 30 facing the outlet port 11 of the fitting provides the discharge end of the outlet branch passage 18.

Water flowing upwardly through the inlet branch passage 17 is delivered to the interior of the chemical pot 5 through a relatively short dispersing tube 32 threaded into the upper end of the inlet branch passage 17. The upper end of this tube is crimped as indicated at 33 to close the same, and the tube is provided with a series of equi-spaced relatively narrow circumferential slits 34 in its side wall along its entire length to assure dispersion of the water entering the receptacle in substantially all directions throughout the body of the chemicals contained in the receptacle.

The outlet branch passage 18 has a discharge tube 35 threaded into its upper end, and this tube is relatively long so as to extend upwardly throughout the entire body of chemicals in the receptacle and to terminate at a point adjacent to the top of the receptacle. The upper end of the tube 35 is likewise crimped as at 36 to close the same, and its upper end portion has its side wall likewise provided with a series of relatively narrow circumferential slits 34 to enable the water rising in the receptacle from the inlet tube 32 to enter the outlet tube and be discharged back to the passage 9 of the fitting through the outlet branch passage 18.

In order that the pot or receptacle 5 may be recharged with chemicals from time to time as the same become depleted, the pot is provided with a removable cover 38 at its upper end having a screw threaded connection with the receptacle. This connection is rendered water tight by means of the usual gasket, and it is to be understood that covers other than that shown may be employed for the same purpose to equal advantage. It is to be understood, however, that the valves 23 are closed before the cover is removed to add chemicals to the receptacle.

As noted previously, the upright wall portion 14 projects laterally only about one-half way across the passage 9, and hence has very little restricting effect upon the main passage of the valve body. Ordinarily, water entering the valve body or fitting 7 through its inlet port 10 would flow freely and substantially unrestrictedly around the wall portion 14 and through the passage 9 to the outlet port 11, bypassing the flow opening 29 which constitutes the mouth of the inlet branch passage 17. An automatically adjustable pressure responsive restriction in the nature of a rubber flap valve 40, however, assures that some of the water flowing through the passage 9 will be diverted into the mouth of the inlet branch passage 17 for circulation through the chemical pot 5. This valve is preferably made of a relatively flat sheet of rubber having good resilient and flexible characteristics so as to be readily responsive to pressure changes at opposite sides thereof, and is like that which broadly forms the subject matter of the aforementioned copending application of Vernon J. Palmer.

The flap valve 40 has a shape to fit the cross sectional shape of that portion of the passage 9 which lies alongside the wall portion 14 in the passage, in the present case rectangular, but it should be noted that the valve clears the sides and the top of the passage 9 to enable some water to flow past it during times when there is only a slight demand for treated water. An enlarged cylindrical bead 41 at the lower end of the flap valve is received snugly in a suitable aperture 42 extending transversely through the inner end portion of a plug 43 threaded into a depending neck on the underside of the fitting 7 medially of the ends of the passage 9. The aperture 42 of the fitting, of course, opens to the inner extremity of the plug through a reduced slot 44 just wide enough to accommodate the flat portion of the flap valve adjacent to the bead 41 thereon.

In this manner the flap valve 40 is detachably maintained in a transverse position in the passage 9, opposite the wall portion 14, and it will be noted that the resiliency of the material from which the flap valve is made normally causes the valve to assume an upright position in the passage, nearly closing the same.

Because of its central position in the passage 9, the flap valve can be said to divide the passage into an inlet chamber 46 on the upstream side of the valve communicating with the inlet port 10 of the fitting and the inlet branch passage 17 through the adjacent flow opening 29, and defining an outlet chamber 47 on the downstream side of the valve communicating with the outlet port 11 and the outlet branch passage 18 through the flow opening 30.

The function of the flap valve is to so restrict the passage 9 at times of little demand for treated water as to cause a slightly higher pressure to be maintained in the inlet chamber 46 than in the outlet chamber 47. Because of this pressure differential some of the water in the inlet chamber, being at the higher pressure, is diverted through the flow opening 29 and into the inlet branch passage 17 for circulation through the chemical pot 5, to be returned to the outlet chamber 47 and hence to the water feeder line 8 through the outlet branch passage 18 and the flow opening 30 adjacent to the outlet port 11. The remaining portion of the water entering the fitting by-passes the flap valve and flows through the passage 9 to its outlet port 11.

It will be understood, of course, that inasmuch as the treated water circulated through the chemicals in the pot 5 is returned to the outlet chamber 47 it serves to transfer chemicals from the pot to the water which has by-passed the chemical pot to thereby treat all of the water flowing through the passage 9.

At times when there is a greater demand for treated water, the pressure in the outlet chamber 47 at the downstream side of the flap valve tends to be greatly reduced, and the force of water entering the inlet chamber 46 acts upon the flap valve to flex the same in a downstream direction to a position less restricting the flow of water through the passage 9. This assures against an objectionably high pressure drop in the feeder line, downstream from the conditioning device, enabling the device to meet the demand for water, at the same time assuring that there will always be a sufficient pressure differential between the inlet and outlet chambers as to cause diversion of water entering the fitting upwardly through the inlet branch passage 17 for circulation through the chemical pot.

It will be noted that the flap valve 40 is entirely pressure responsive and that it will yield in the downstream direction in proportion to the pressure differential at opposite sides thereof so as to less restrict the passage 9 in accordance with an increasing demand for treated water. Stated in another way, it is the function of the flap valve to yield in the downstream direction an amount directly proportional to the demand for treated water to enable the demand to be met by the conditioning device.

In order that the chemical pot or receptacle 5 may be drained of water whenever the same is shut off from the passage 9 by closure of the conventional faucet valves 23, the pot is provided with a conventional drain cock 50 threaded into the side wall of the pot adjacent to the bottom thereof as seen best in Figure 1. This drain cock also causes any pressure in the chemical pot to be relieved and greatly facilitates the addition of chemicals to the pot whenever they become depleted.

From the foregoing description it will be readily apparent to those skilled in the art that this invention provides an improved water conditioning device having a valve body or fitting so constructed as to not only enable the use of a pressure responsive flap valve to yieldingly restrict the water feeder line, but to also enable conventional faucet valves to be used for controlling communication between the feeder line and the chemical pot of the device.

What we claim as our invention is:

1. A valve unit for diverting part of the water flowing in a feeder line into a receptacle, said valve unit comprising: a body having a main passage therethrough the ends of which provide inlet and outlet ports connectable with a water feeder line so that said main passage may form a section of the feeder line; means on said body defining a branch passageway opening to the exterior of the body and to the main passage therein for communicating the main passage with a receptacle; and yieldable means in the main passage downstream from the mouth of said branch passageway defining a restriction extending substantially transversely across said main passage to restrict the same sufficiently to cause part of the water entering the main passage at low velocity to be diverted into said branch passage, said restriction being yieldable in consequence to the force of water entering the main passage at higher velocity to a position less restricting the passage to thereby avoid an objectionably high pressure drop at the downstream end of the passage.

2. A valve unit for diverting part of the water flowing in a feeder line into a receptacle, said valve unit comprising: a valve body having a passageway for the flow of water therethrough; fixed restriction means on the body extending a short way into said passageway from the side and intermediate the ends thereof; conduit means leading from said passageway on the upstream side of said fixed restriction and connectable with the receptacle so that water may be conducted from said passageway to the receptacle; other conduit means leading into said passageway on the downstream side of said fixed restriction and connectable with said receptacle to return water therein to the passageway; and a flexible restriction mounted in the passageway opposite said fixed restriction and normally extending toward the fixed restriction so that said restrictions cooperate to create a pressure differential at opposite sides thereof by which a portion of the water entering the passageway is caused to flow through the first mentioned conduit means, said flexible restriction being capable of flexure out of its normal position in the passageway to a position less restricting the passageway in consequence to the force of water entering the passageway at high velocity to preclude objectionably high pressure drop at the downstream end of the passageway.

3. A valve unit for communicating a receptacle or the like with a water feeder line, comprising: a fitting having a main passage therethrough, the ends of which provide inlet and outlet ports connectable with a water feeder line so that said main passage may form a section of the feeder line; a heavy wall portion on one side wall of the fitting projecting part way into said main passage intermediate the ends thereof; means on the fitting providing a pair of branch passages extending into said heavy wall portion, one upstream from the other, and each communicating with the main passage adjacent to one end of the fitting; a pair of ducts on the fitting, one of said ducts communicating with one of the branch passages and the other of said ducts communicating with the other of said branch passages, so that each of said branch passages may be communicated with a receptacle through the ducts and whereby water entering said main passage may flow into the upstream one of said branch passages and through its duct to the receptacle and may be returned to the main passage from said receptacle through the other of said ducts and its branch passage; a valve in each of said branch passages; and an elongated strip of resilient material secured at one of its ends to the fitting and extending into the main passage intermediate the points of communication of the branch passages therewith, with one of its faces substantially transversely to the axis of the passage, said strip being of a size and shape to substantially block the passage and thus provide a yieldable pressure responsive restriction in the main passage whereby a substantially constant proportion of the flow through the main passage will be diverted into the upstream one of said branch passages.

4. A valve unit of the character described, comprising: a valve body having a main passage extending horizontally therethrough, the ends of which provide inlet and outlet ports connectable with a water feeder line so that said main passage may form a section of the feeder line; a neck on an upper portion of the valve body for attachment to the mouth of a receptacle; an upright heavy wall portion on the valve body extending part way into said main passage, intermediate the ends thereof, from one side wall of the body and beneath said neck; said valve body having a pair of substantially horizontal bores leading thereinto from said side of the body and extending into said heavy wall portion on axes converging toward the center of the main passage, said heavy wall portion having a pair of flow openings formed therein, one adjacent to said inlet port and the other adjacent to said outlet port and each communicating one of said bores with the main passage; means on the valve body defining a pair of branch passages each having its lower end communicated with the inner end of one of said bores in the body, said branch passage extending upwardly in said heavy wall portion and through the neck to provide for connection of a receptacle having its mouth attached to said neck, in parallel flow relationship with the main passage of the valve body; an annular valve seat in the inner end of each of said bores; a pair of faucet valves mounted on said side of the valve body with the spindle of each received in one of said bores and with a closure disc on the inner end of each spindle movable into and out of engagement with the adjacent valve seat to control the flow of water through the corresponding branch passage; and yieldable pressure responsive restricting means mounted in said main passageway intermediate the ends thereof and between said upright wall portion and the opposite wall of the body.

5. A valve unit for diverting a substantially constant proportion of the liquid flowing in a feeder line into a receptacle, said valve unit comprising: a valve body having a main passageway for the flow of liquid therethrough and a branch passageway extending through one side of the body for connection with a receptacle and communicating with said main passageway; a plug detachably received in a bore in the body opening to said main passageway downstream from the point of communication therewith of said branch passageway; and a yieldable pressure responsive restriction in the main passageway comprising an elongated strip of resilient material having one of its ends secured to said plug and extending across said main passageway with its faces substantially normal to the direction of flow therethrough, said strip being of a size and shape to substantially fill the portion of the main passageway which it occupies when unflexed so as to divert liquid entering the main passageway at low velocity into the branch passageway, but being yieldable to the flow of liquid into said passageway at higher velocity to a position less restricting the main passageway to thereby avoid an objectionably high pressure drop at the downstream end of the main passageway.

VERNON J. PALMER.
JULIUS S. JUDELL.

References Cited in the file of this patent

UNITED STATES PATENTS

| Number | Name | Date |
|---|---|---|
| 423,773 | Jewell et al. | Mar. 18, 1890 |
| 560,764 | Taylor | May 26, 1896 |
| 1,108,153 | Eells et al. | Aug. 25, 1914 |
| 1,409,248 | Sevcik | Mar. 14, 1922 |
| 1,650,829 | Grant | Nov. 29, 1927 |
| 1,710,301 | Earl | Apr. 23, 1929 |
| 1,855,323 | Sirch | Apr. 26, 1932 |
| 1,948,971 | Meyer | Feb. 27, 1934 |
| 2,462,886 | Morrow | Mar. 1, 1949 |
| 2,489,932 | Rosenblum | Nov. 29, 1949 |
| 2,512,694 | Stour | June 27, 1950 |